(12) United States Patent
Knorr et al.

(10) Patent No.: US 8,531,065 B2
(45) Date of Patent: Sep. 10, 2013

(54) ELECTRIC MOTOR, ESPECIALLY EXTERNAL ROTOR MOTOR

(75) Inventors: Joachim Knorr, Niederstetten (DE); Thorsten Sturm, Krautheim (DE)

(73) Assignee: Ziehl-Abegg AG, Künzelsau (DE)

( * ) Notice: Subject to any disclaimer, the term of this patent is extended or adjusted under 35 U.S.C. 154(b) by 329 days.

(21) Appl. No.: 12/968,369

(22) Filed: Dec. 15, 2010

(65) Prior Publication Data

US 2011/0148230 A1    Jun. 23, 2011

(30) Foreign Application Priority Data

Dec. 18, 2009  (EP) .................................. 09015696

(51) Int. Cl.
*H02K 7/14* (2006.01)
*H02K 9/00* (2006.01)

(52) U.S. Cl.
USPC .................... 310/58; 310/62; 310/64; 310/88

(58) Field of Classification Search
USPC .................... 310/58, 60 R, 62–64; 417/423.8
See application file for complete search history.

(56) References Cited

U.S. PATENT DOCUMENTS

| | | | | |
|---|---|---|---|---|
| 3,961,864 A * | 6/1976 | Papst et al. | .................... | 417/354 |
| 4,554,472 A | 11/1985 | Kumatani | | |
| 4,724,347 A * | 2/1988 | Reinhardt et al. | .......... | 310/68 R |
| 5,049,769 A * | 9/1991 | Reinhardt et al. | .............. | 310/64 |
| 5,532,534 A | 7/1996 | Baker et al. | | |
| 5,574,321 A * | 11/1996 | Baker | ........................ | 310/67 R |
| 6,384,494 B1 * | 5/2002 | Avidano et al. | .................. | 310/58 |
| 6,762,521 B2 * | 7/2004 | Peter et al. | ........................ | 310/89 |
| 7,132,772 B2 * | 11/2006 | Takeuchi et al. | ................ | 310/88 |
| 7,227,287 B2 * | 6/2007 | Noda et al. | .................. | 310/68 R |
| 8,376,368 B2 * | 2/2013 | Skorucak | ...................... | 277/412 |
| 2001/0017498 A1 | 8/2001 | Matsuoka et al. | | |
| 2006/0175915 A1 * | 8/2006 | Voigt et al. | ...................... | 310/58 |

FOREIGN PATENT DOCUMENTS

| | | | |
|---|---|---|---|
| EP | 0 917 274 | * | 5/1999 |
| EP | 1278288 | * | 1/2003 |
| JP | 2005-324059 A | | 11/2005 |

* cited by examiner

*Primary Examiner* — Burton Mullins
(74) *Attorney, Agent, or Firm* — Gudrun E. Huckett

(57) ABSTRACT

An electric motor has a stator bushing in which components that generate heat are disposed. A rotor housing that has at least one air conveying element is rotatably connected to the stator bushing. The air conveying element has a top side that is facing the stator bushing and that is at least basically smooth. The air conveying element has an annular disk that is provided with the basically smooth top side. The air conveying element has flow guiding elements that are radially extending ribs provided on the bottom side of the annular disk.

11 Claims, 3 Drawing Sheets

ELECTRIC MOTOR, ESPECIALLY EXTERNAL ROTOR MOTOR

BACKGROUND OF THE INVENTION

The invention concerns an electric motor, in particular an external rotor motor, comprising a stator bushing in which components that generate heat are disposed and comprising a rotor housing that has at least one air conveying element.

Electric motors are known in which the stator bushing on the exterior near the rotor housing has cooling elements in the form of cooling ribs that are uniformly distributed at a spacing about the circumference of the stator bushing. Opposite these cooling ribs there are rotor cooling ribs that form an air conveying element. Upon operation of the electric motor, as a result of the cooling ribs rotating relative to one another, external air is sucked in as cooling air and guided between the cooling ribs that rotate relative to each other. A good air guiding action along the cooling ribs is not possible in this way. Moreover, because of the edges facing each other of the stator cooling ribs and the rotor cooling ribs, a significant noise development occurs that is disruptive when using the electric motor.

Electric motors are also known in which the rotor on the inner side has a cooling wheel. With it, external air is sucked in through openings in the motor housing. The air flows past the motor electronics to be cooled and absorbs heat by doing so. The heated air then exits laterally from the motor housing.

In another known electric motor the rotor is provided with a fan wheel for cooling control electronics disposed within a housing provided with cooling ribs.

The invention has the object to design an electric motor of the aforementioned kind in such a way that it ensures an optimal cooling action with minimal noise development while it has a simple configuration.

SUMMARY OF THE INVENTION

According to the present invention, this object is solved for an electric motor of the aforementioned kind in that the air conveying element has a top side that is facing the stator bushing and that is at least basically smooth.

In the electric motor according to the invention the air conveying element that is positioned opposite the stator bushing is provided with a top side that is at least basically smooth. It causes the sucked-in air to be reliably deflected or guided in radial direction inwardly. As a result of the thereby achieved uniform air flow an optimal cooling action is provided. Since the air conveying element is provided with the basically smooth top side, only a minimal noise development occurs upon operation of the electric motor according to the invention, even at high engine speed. When the stator bushing on its outer side is provided with cooling elements, for example, in the form of cooling ribs, by use of the at least basically smooth top side it is prevented that edges of the cooling elements pass each other which would lead to great noise development, in particular at high engine speeds.

Advantageously, the air conveying element has an annular disk that is provided with the basically smooth top side. This annular disk is positioned in a radial plane of the rotor housing and ensures that the sucked-in air is guided in uniform distribution across the circumference of the rotor housing inwardly in radial direction.

In order for the sucked-in, inwardly flowing air to reach the bottom side of the air conveying element, the latter is provided with at least one through opening. The air thus flows from the exterior of the electric motor along the air conveying element inwardly and reaches through the opening the area below the air conveying element. In this way, a long flow path is provided that leads to an optimal cooling action of the heated components of the electric motor.

Advantageously, in the flow direction behind the through opening flow guiding elements are provided. They ensure that the air, after passing through the through opening, is returned by the flow guiding elements uniformly to the exterior. The sucked-in air is thus deflected along its flow path by about 180 degrees at a radial inward location. In this way, despite small radial dimensions a long flow path for the air is provided so that an optimal heat dissipation is ensured.

The flow guiding elements are advantageously radially extending ribs that are provided on the bottom side of the annular disk. These ribs are positioned advantageously in axial planes of the rotor housing. The air is guided by means of the radially extending ribs uniformly across the circumference to the exterior. The ribs delimit circumferentially flow spaces for the deflected air. By adjusting the spacing of the ribs relative to each other, the flow speed of the air after defection can be adjusted in a very easy way.

In order to ensure a uniform cooling action across the circumference of the electric motor, the flow guiding elements are advantageously distributed uniformly across the circumference of the air conveying element.

It is however also possible to provide the flow guiding elements in a non-uniform arrangement across the circumference of the air conveying element.

In order for the air that is sucked in from the exterior to be distributed uniformly between the flow guiding elements across the circumference of the air conveying element, the flow guiding elements advantageously project past the annular disk in radial direction inwardly. In this way, it is achieved that the sucked-in air by means of the projecting flow guiding elements is uniformly divided into individual flow sections so that across the circumference of the air conveying element a uniform heat dissipation is achieved.

It is particularly advantageous when the through opening is an annular opening that extends about the circumference of the air conveying element. Then the uniform distribution of the sucked-in air about the circumference of the air conveying element is reliably achieved.

The annular opening is advantageously delimited in radial direction outwardly by the radial inner edge of the annular disk of the air conveying element.

An advantageous embodiment results when the air conveying element is formed monolithically with a seal that seals the stator bushing relative to the rotor housing. In this case, the air conveying element is comprised of the same plastic material as the seal.

When the air conveying element and the seal are not formed monolithically with each other, the best suited materials with respect to their functional task can be used for the two components. For example, the air conveying element can be comprised of metallic material in order to contribute to an optimal heat dissipation.

Further features of the invention result from the further claims, the description and the drawings.

The invention will be explained in more detail with an embodiment illustrated in the drawing. It is shown in:

DESCRIPTION OF PREFERRED EMBODIMENTS

Figure 1:
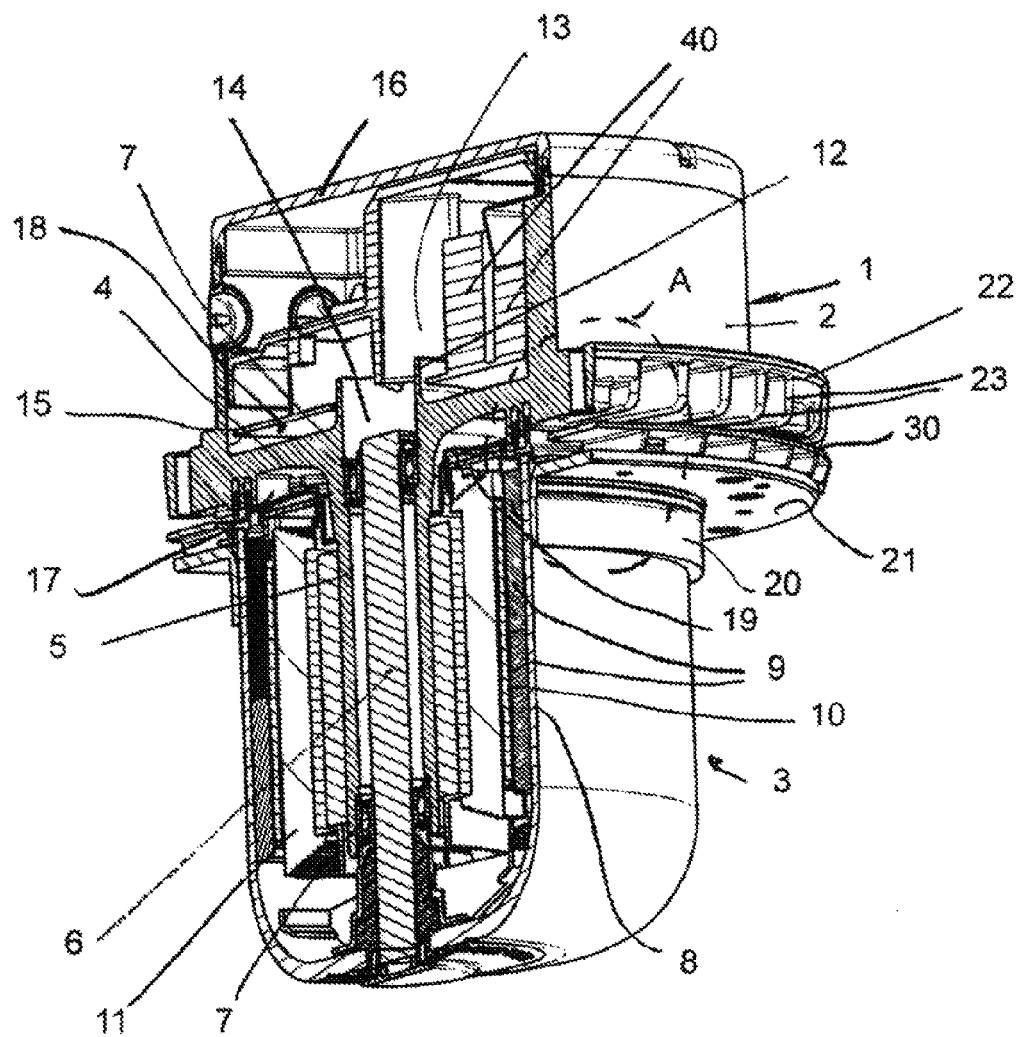
FIG. 1 in a perspective illustration and in section an electric motor according to the invention.
Figure 2:
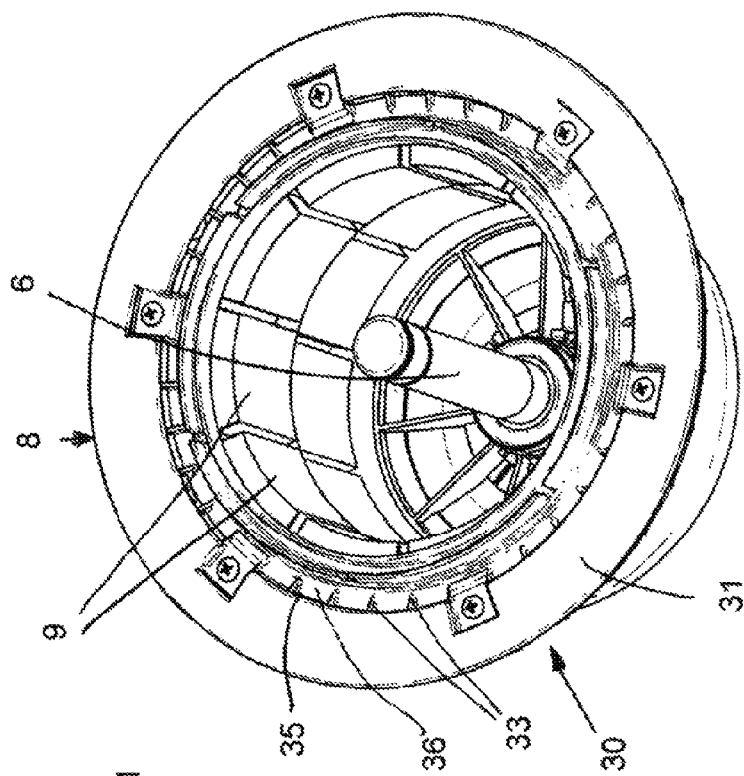
FIG. 2 in a perspective illustration a rotor of the electric motor according to the invention.

The electric motor in the embodiment is an external rotor motor that may be, for example, an electronically commutated direct current motor. The electric motor has a stator bushing 1 with a jacket 2 that is preferably cylindrical. The stator bushing 1 has at the end facing the rotor 3 a bottom 4 from which projects centrally a bushing-shaped support pipe 5 that extends into the rotor 3. The support pipe 5 is advantageously a monolithic part together with the bottom 4. In the support pipe 5 a motor shaft 6 is supported so as to be rotatable by means of two bearings 7 near the top end and bottom end. The bearings 7 in the embodiment are ball bearings but can also be any other suitable bearing.

The rotor 3 has a motor housing 8 having permanent magnets 9 attached to its inner side. They surround with formation of an annular air gap 10 a stator pack 11 that is provided with a stator coil as is known in the art.

The support pipe 5 continues as an annular projection 12 that projects past the bottom 4 into the interior 13 surrounded by the stator jacket 2. The projection 12 is formed advantageously monolithically with the bottom 4 and surrounds a passage 14 in the bottom 4. The projection 12 is advantageously of cylindrical shape and is positioned preferably approximately centrally relative to the bottom 4. In axial direction the projection 12 is shorter than the stator jacket 2 positioned coaxially thereto. Between the projection 12 and the stator jacket 2 there is an annular receiving space 15 into which a potting compound can be introduced.

A cover 16 is placed onto the end face of the stator jacket 2 that, as is known in the art, is fixedly and seal-tightly connected to the stator jacket 2.

The bottom 4 of the stator bushing 1 separates the interior 13 that forms an electronics chamber from a motor chamber 17. In the interior 13 there is an annular receiving space 15 that is filled with potting compound. In it, a circuit board 18 is provided that supports the electric/electronic components 40 for operating the electric motor. In the motor space 17 there is a circuit board 19 of the motor that is embedded in a potting compound.

On the exterior of the rotor housing 8 on the upper end that is facing the stator bushing 1 a rotor flange 20 is attached. It has a disk part 21 that projects in radial direction outwardly.

On the end that is facing the rotor housing 8, the jacket 2 of the stator bushing 1 is provided with a flange 22 that extends in radial direction outwardly and is advantageously monolithically formed together with the jacket 2. On the bottom side of the flange 22 that is facing the rotor flange 20 cooling ribs 23 are provided that extend at least across the radial width of the flange 22. The cooling ribs 23 are positioned at a spacing behind one another.

Between the jacket 2 of the stator bushing 1 and the motor housing 8, there is a labyrinth gap 24. Three annular projections 25 project away from the bottom 4 of the stator bushing 1 in the direction toward the motor housing 8 and are positioned coaxially to each other and form between them two annular spaces 26 engaged by two coaxially positioned narrow annular webs 27 with play. They are part of a sealing element 28 compromised of plastic material that is attached to the end face of the rotor housing 8. The cooling ribs 23 extend radially up to the outwardly positioned annular projection 25 of the stator bushing 1.

On the flange 22 of the stator bushing 1 a disk-shaped support element 29 is fastened that projects radially past the flange 22 and by means of which the electric motor is secured. In the embodiment, the radially projecting area of the support element 29 is approximately as wide as the area of the support element resting on the flange 22. Of course, the projecting area of the support element 29 extending past the flange 22 can also be selected to be different.

Figure 3:
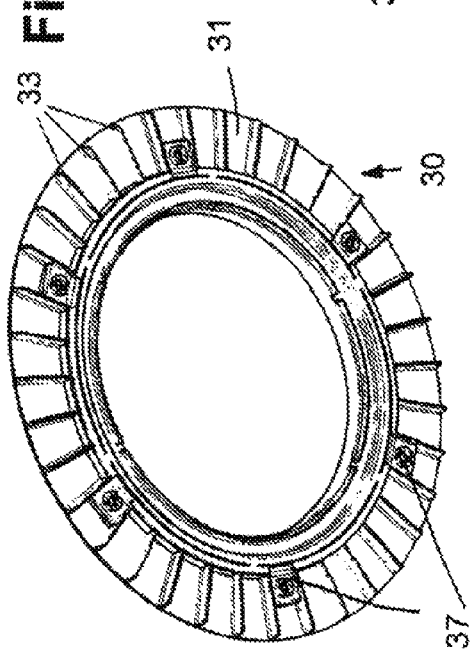
FIG. 3 in a perspective illustration the bottom side of an air conveying element of the electric motor according to the invention.
Figure 4:
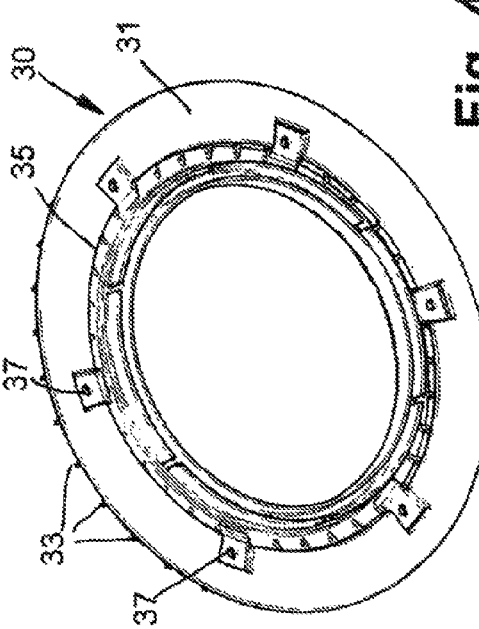
FIG. 4 in a perspective illustration a plan view onto the air conveying element according to FIG. 3.

The rotor 3 is provided with at least one air conveying element 30 that is positioned at a spacing axially opposite the cooling ribs 23 of the stator bushing 1. The air conveying element 30 has an annular disk 31 whose top side 32 that is facing the ribs 23 is flat. At the bottom side of the annular disk 31 there are ribs 33 which extend in radial direction across the entire width of the annular disk 31 (FIG. 3). The ribs 33 are uniformly distributed across the circumference of the annular disk 31 and they each are advantageously of the same configuration.

Figure 5:
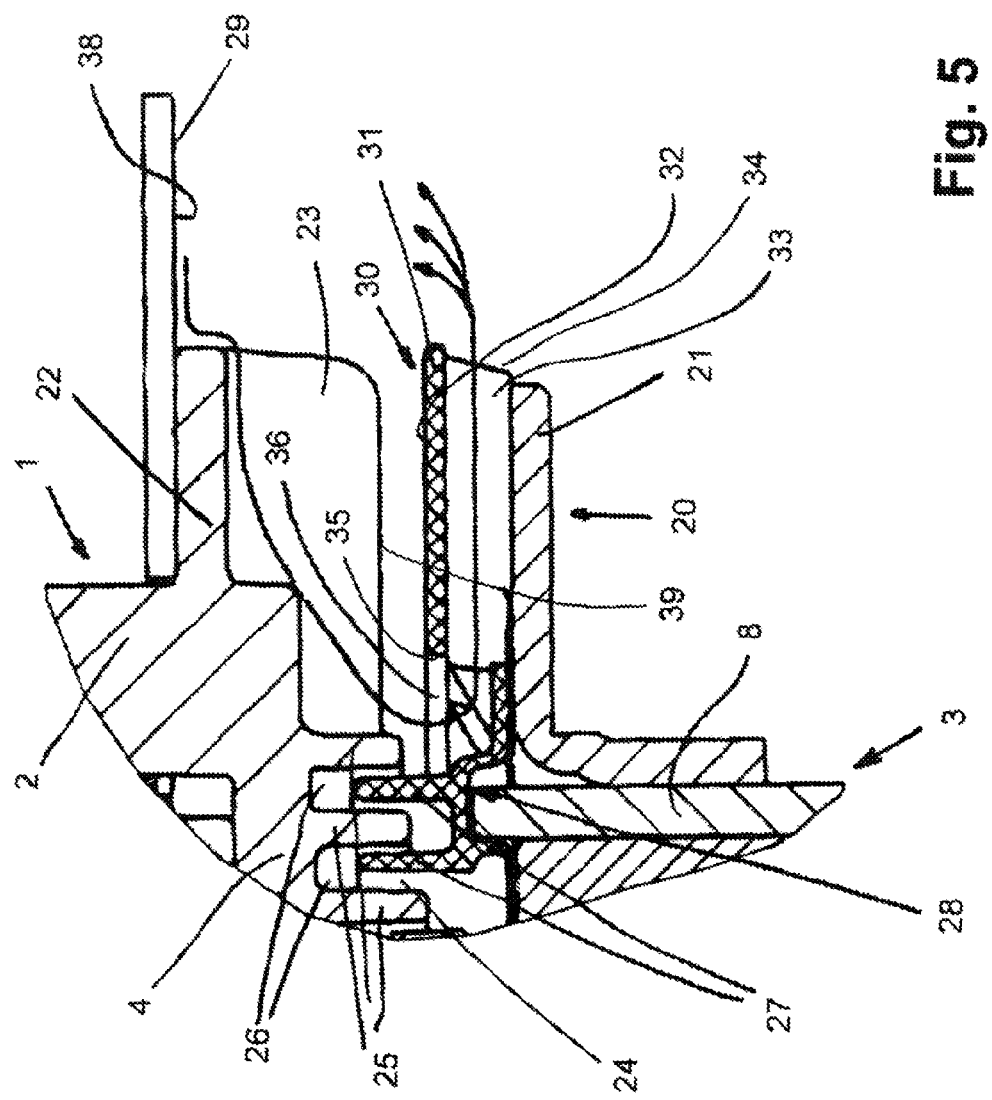
FIG. 5 in enlarged illustration and in section the detail A of FIG. 1.

The annular disk 31 projects radially slightly past the annular disk part 21 of the rotor flange 20. The radial outer end face 34 of the ribs 33 is obliquely slanted downwardly (FIG. 5). The radial inner edge 35 of the annular disk 31 has radial spacing from the radial outer annular projection 25 of the stator bushing 1 or the radial outer annular web 27 of the sealing element 28. In this way, about the circumference of the annular disk 31 an annular opening 36 is formed through which, in a way to be described, air can flow underneath the annular disk 31.

The air conveying element 30 is advantageously detachably fastened on the rotor housing 8. For this purpose, fastening elements 37 are provided in uniform distribution across the circumference of the annular disk 31, with which the air conveying element 30 is attached to the rotor 3.

Advantageously, the sealing element 28 and the air conveying element 30 are formed monolithically with each other so that they can be mounted as a unit on the rotor 3.

The electric/electronic components 40 as well as further parts in the stator bushing 1 will heat up during operation of the electric motor. Therefore, also the stator bushing 1 with the bottom 4 and the support element 29 are heated. The cooling ribs 23 of the stator bushing 1 ensure heat dissipation and thus cooling of the stator bushing 1. The air conveying element 30 generates a maximum air quantity for an optimal cooling action without this causing great noise development. The air conveying element 30 that is fixedly connected to the rotor housing 8 rotates upon operation of the electric motor relative to the stator bushing 1. This rotation causes ambient air to be sucked in between the cooling ribs 23 of the stator bushing 1. In FIG. 5, the appropriate flow arrows of the sucked-in air are indicated. The support element 29 ensures that this air is guided in directed flow to the area of the cooling ribs 23. The flat bottom side 38 of the support element 29 ensures a disruption-free supply of the cooling air that flows between the cooling ribs 23 positioned in circumferential direction at a spacing behind each other. In radial direction inwardly, the air is deflected by the cooling ribs 23 and the bottom 4 with the annular projections 25 in the downward direction such that the air flows through the annular opening 36. The sucked-in air reaches thus the area below the annular disk 31 of the air conveying element 30. Here, the air is radially deflected in outward direction between the ribs 33 of the bottom side of the annular disk 31. Since the ribs 33 extend up to the annular opening 36, the sucked-in air reaches uniformly all intermediates spaces between the ribs 33. In this way, it is ensured that the sucked-in air is sucked in and dissipated uniformly across the circumference of the stator bushing 1. The annular disk 31 with the ribs 33 generates a defined flow direction for the cooling air so that an optimal cooling action is achieved.

The strength of the flow can be matched in a simple way to the respective application. For example, the spacing between the annular disk 31 and the cooling ribs 23 of the stator bushing 1 can be varied. In addition, the radial width of the annular opening 36 can be varied. By interaction of the axial spacing of the annular disk 31 from the cooling ribs 23 and the radial width of the annular opening 36, the flow speed of the sucked-in cooling air and thus the cooling action can be adjusted in an optimal way. Also, by adjusting the spacing between the ribs 33 the flow speed and thus the cooling action can be affected.

Since the top side 32 of the annular disk 31 is smooth, there are no component edges that upon sucking in the cooling air will cause a significant noise load. The air is guided across the smooth top side 32 of the annular disk 31 in radial direction inwardly. Since the lower edges 39 of the cooling ribs 23 are positioned opposite the smooth top side 32 of the annular disk 31, the cooling air itself is sucked in at high flow speed almost noise-free.

The annular disk 31 is preferably of a monolithic configuration. However, it could be comprised of individual ring segments that are joined to the annular disk. The air conveying element 30 is comprised preferably of plastic material so that the air conveying element can be produced in a simple and inexpensive way. When it is formed in an advantageous way monolithically with the sealing element 28, a simple and inexpensive manufacture as well as a problem-free assembly are provided.

The high air flow rate that is achieved by the air conveying element 30 provides a high cooling effect so that the cooling ribs 23, the flange 22, as well as the support element 29 are cooled in an excellent way. In this way, the heat that is produced in the interior of the stator bushing 1 can be dissipated properly.

What is claimed is:

1. An electric motor comprising:
    a stator bushing in which components that generate heat are disposed;
    a rotor housing that has at least one air conveying element and that is rotatably connected to the stator bushing;
    wherein the air conveying element has a top side that is facing the stator bushing and that is at least basically smooth;
    wherein the air conveying element comprises an annular disk that is provided with the top side that is basically smooth;
    wherein the air conveying element has flow guiding elements that are radially extending ribs provided on a bottom side of the annular disk.

2. The electric motor according to claim 1, wherein the flow guiding elements are arranged in uniform distribution across a circumference of the air conveying element.

3. The electric motor according to claim 1, wherein the flow guiding elements are arranged in non-uniform distribution across a circumference of the air conveying element.

4. The electric motor according to claim 1, wherein the flow guiding elements project past the annular disk in radial direction inwardly.

5. The electric motor according to claim 1, wherein the air conveying element has at least one through opening through which the cooling air flows.

6. The electric motor according to claim 1, wherein the air conveying element is formed monolithically together with a seal that seals the stator bushing relative to the rotor housing.

7. An electric motor comprising:
    a stator bushing in which components that generate heat are disposed;
    a rotor housing that has at least one air conveying element and that is rotatably connected to the stator bushing;
    wherein the air conveying element has a top side that is facing the stator bushing and that is at least basically smooth;
    wherein the air conveying element has at least one through opening through which the cooling air flows;
    wherein the air conveying element comprises flow guiding elements that, in a flow direction of the cooling air, are positioned behind the through opening.

8. An electric motor comprising:
    a stator bushing in which components that generate heat are disposed;
    a rotor housing that has at least one air conveying element and that is rotatably connected to the stator bushing;
    wherein the air conveying element has a top side that is facing the stator bushing and that is at least basically smooth;
    wherein the air conveying element has at least one through opening through which the cooling air flows;
    wherein the through opening is an annular opening that extends circumferentially on the air conveying element.

9. The electric motor according to claim 8, wherein the air conveying element comprises an annular disk that is provided with the top side that is basically smooth.

10. The electric motor according to claim 9, wherein the air conveying element has flow guiding elements that are radially extending ribs provided on a bottom side of the annular disk.

11. The electric motor according to claim 8, wherein the annular opening is delimited in radial direction outwardly by a radial inner edge of an annular disk of the air conveying element.

* * * * *